US012418698B2

(12) United States Patent
Maeda (10) Patent No.: US 12,418,698 B2
(45) Date of Patent: Sep. 16, 2025

(54) VIDEO VIEWING PROVIDING DEVICE, VIDEO VIEWING PROVIDING METHOD, AND VIDEO VIEWING PROVIDING PROGRAM (71) Applicant: INFORM SYSTEM INC., Osaka (JP)

(72) Inventor: Yasushi Maeda, Osaka (JP)

(73) Assignee: INFORM SYSTEM INC., Osaka (JP)

( * ) Notice: Subject to any disclaimer, the term of this patent is extended or adjusted under 35 U.S.C. 154(b) by 66 days.

(21) Appl. No.: 18/252,049

(22) PCT Filed: Oct. 18, 2021

(86) PCT No.: PCT/JP2021/038410
§ 371 (c)(1),
(2) Date: May 8, 2023

(87) PCT Pub. No.: WO2022/123912
PCT Pub. Date: Jun. 16, 2022

(65) Prior Publication Data
US 2024/0007710 A1    Jan. 4, 2024

(30) Foreign Application Priority Data

Dec. 10, 2020  (JP) .................................. 2020-204706
Mar. 26, 2021  (JP) .................................. 2021-053227

(51) Int. Cl.
*H04N 21/442*    (2011.01)
*H04N 21/488*    (2011.01)
(Continued)

(52) U.S. Cl.
CPC ... *H04N 21/44204* (2013.01); *H04N 21/4884* (2013.01); *H04N 21/812* (2013.01); *H04N 21/8456* (2013.01)

(58) Field of Classification Search
None
See application file for complete search history.

(56) References Cited

U.S. PATENT DOCUMENTS

2003/0061280 A1*  3/2003  Bulson .................. H04L 65/765
                                              348/E7.063
2006/0015902 A1   1/2006  Matsuura et al.
(Continued)

FOREIGN PATENT DOCUMENTS

JP    2002-149897 A    5/2002
JP    2005-073185 A    3/2005
(Continued)

OTHER PUBLICATIONS

International Search Report issued in Patent Application No. PCT/JP2021/038410 dated Dec. 28, 2021.

*Primary Examiner* — Jason K Lin
(74) *Attorney, Agent, or Firm* — MCDONALD HOPKINS LLC (57) ABSTRACT

[Problem]
To provide a video viewing providing device, a video viewing providing method, and a video viewing providing program that, during video delivery, allow for visualization of which scene has been viewed by each user, and make it possible to easily evaluate a video or the user who has viewed the video.
[Solution]
A video viewing providing device 100 comprises: a video delivery unit 10 for delivering a video to a plurality of users; a scene setting unit 20 for setting scenes with a caption at a plurality of locations of the video; a viewing evaluating unit 30 for checking whether the user has viewed a location where a scene with a caption is set; and a feedback unit 40 for feeding back an evaluating result of the viewing evaluating unit to the user and a delivery source of the video. The scene setting unit 20 generates data of a plurality of scenes with a caption including captions and a start time and an end time in the time line of the video.

8 Claims, 4 Drawing Sheets (51) Int. Cl.
  *H04N 21/81*    (2011.01)
  *H04N 21/845*   (2011.01)

(56) References Cited

U.S. PATENT DOCUMENTS

| | | | |
|---|---|---|---|
| 2010/0050202 A1* | 2/2010 | Kandekar | H04H 60/46 |
| | | | 725/14 |
| 2019/0075340 A1* | 3/2019 | Hochart | H04N 21/4882 |
| 2019/0110107 A1* | 4/2019 | Ma | H04N 21/44 |
| 2020/0350074 A1* | 11/2020 | Kim | A61B 5/0022 |

FOREIGN PATENT DOCUMENTS

| | | |
|---|---|---|
| JP | 2006-054630 A | 2/2006 |
| JP | 2006-260275 A | 9/2006 |
| JP | 2010-259105 A | 11/2010 |
| JP | 2011-124656 A | 6/2011 |
| JP | 2014-229992 A | 12/2014 |
| JP | 2017-224010 A | 12/2017 |
| JP | 2019-062502 A | 4/2019 |
| JP | 2019-523935 A | 8/2019 |
| JP | 2019-216355 A | 12/2019 |
| WO | 2004/045221 A1 | 5/2004 |

\* cited by examiner

| NO. | CAPTION | START TIME | END TIME | POINTS | COMMENTS |
|---|---|---|---|---|---|
| 1 | NEXT TERM IMPORTANT DATA PRESENTATION | 05:40 | 06:05 | 20 | |
| 2 | NEXT TERM IMPORTANT ISSUE | 10:30 | 11:25 | 20 | DEVELOPMENT DEPARTMENT |
| 3 | NEXT TERM IMPORTANT ISSUE | 16:17 | 17:12 | 20 | MANUFACTURING DEPARTMENT |
| 4 | NEXT TERM IMPORTANT ISSUE | 18:13 | 18:48 | 20 | SALES DEPARTMENT |
| 5 | PRESENTATION OF SYSTEM FOR TACKLING IMPORTANT ISSUES FOR NEXT TERM | 27:03 | 28:02 | 20 | |

| NO. | CAPTION | START TIME | END TIME | POINTS | VIEWED FLAG |
|---|---|---|---|---|---|
| 1 | NEXT TERM IMPORTANT DATA PRESENTATION | 05:40 | 06:05 | 20 | 1 |
| 2 | NEXT TERM IMPORTANT ISSUE 1 | 10:30 | 11:25 | 20 | 1 |
| 3 | NEXT TERM IMPORTANT ISSUE 2 | 16:17 | 17:12 | 20 | 0 |
| 4 | NEXT TERM IMPORTANT ISSUE 3 | 18:13 | 18:48 | 20 | 0 |
| 5 | PRESENTATION OF SYSTEM FOR TACKLING IMPORTANT ISSUES FOR NEXT TERM | 27:03 | 28:02 | 20 | 1 |
| | USER TOTAL POINTS | | | | 60 |

VIDEO VIEWING PROVIDING DEVICE, VIDEO VIEWING PROVIDING METHOD, AND VIDEO VIEWING PROVIDING PROGRAM

TECHNICAL FIELD

The present invention relates to a video viewing providing device, a video viewing providing method, and a video viewing providing program allowing for evaluation of video viewing by a user.

BACKGROUND

The following patent literature has been disclosed in relation to a video viewing providing device, a video viewing providing method, and a video viewing providing program allowing for evaluation of video viewing by a user.

For example, Patent Literature 1 (Japanese Patent Laid-Open No. 2019-062502) discloses an information processing device that allows for content close to content viewed by a user to be provided easily.

The information processing device described in Patent Literature 1 extracts a second user who has a viewing pattern close to the viewing pattern of a first user on the basis of a playback time and a playback count for each scene included in operation information, which includes a playback start time and a playback end time for each piece of content, and determines, on the basis of operation information about the second user, content that the extracted second user has viewed but the first user has not viewed.

Also, Patent Literature 2 (Japanese Patent Laid-Open No. 2010-259105) describes a program viewing terminal that recommends programs catered to the preferences of a particular user.

The program viewing terminal described in Patent Literature 2 is provided with: a program reception unit that receives a program included in a broadcast wave or communication data; an operation accepting unit that accepts the input of operation information expressing a selection operation by a user for a program received by the program reception unit; a program position information extraction unit that extracts selection position information including at least a start position and an end position of the selection operation in the program on the basis of the selection operation accepted by the operation accepting unit for the program received by the program reception unit; a selection position storage unit that stores the selection position information extracted by the program position information extraction unit; an operation information transmission unit that transmits the selection position information for a program stored in the selection position storage unit to a program recommendation server which is communicatively connected via a network and which creates, according to the selection position information, recommendation information related to a program that matches the preferences of the user, the recommendation information including program identification information and position information within the program; a recommendation information reception unit that receives recommendation information transmitted by the program recommendation server; and a program control unit that performs at least one of playing and erasing a program on the basis of the recommendation information received by the recommendation information reception unit.

Also, Patent Literature 3 (Japanese Patent Laid-Open No. 2002-149897) describes a method of confirming the completion of information viewing on a network, through which the result of viewing video information can be ascertained reliably.

The method of confirming the completion of information viewing described in Patent Literature 3 includes: a step for determining video information to be played from a plurality of pieces of video information; a step for encouraging playback/non-playback of video information; a step for generating playback completion identification means for each piece of video information to be played; a step for activating monitoring means for monitoring playback completion on the basis of the playback completion identification means when a playback instruction is given; and a step for giving notice, through the monitoring means, of playback completion or non-completion.

Also, Patent Literature 4 (Japanese Patent Laid-Open No. 2017-224010) discloses an advertisement viewing confirmation system and advertisement viewing confirmation program with which an advertisement video can be viewed without a burden on the user and which can return a portion of advertising compensation to the user.

The advertisement viewing confirmation program described in Patent Literature 4 is an advertisement viewing confirmation program causing a computer to execute an information storing process for storing identification information for a web page viewed with a web browser as video-related information in storage means and an information transmitting process for transmitting a video-related information dataset included in the video-related information to a server computer, wherein the information storing process includes an identification information determining process for determining whether the identification information for a web page is identification information related to a video, a playback time storing process for recognizing and storing in the storage means the playback time of the video in association with the identification information, and a viewing time storing process for recognizing and storing in the storage means the viewing time of the video in association with the identification information.

Also, Patent Literature 5 (Japanese Patent Laid-Open No. 2019-216355) discloses an information processing device, an information processing method, and an information processing program that can detect highlights for a user appropriately.

The information processing device described in Patent Literature 5 is provided with a scene identification unit that identifies a plurality of scenes included in a video, a user characteristics acquisition unit that acquires user characteristics information related to the characteristics of a user who views the video, and a highlight detection unit that detects highlights according to the characteristics of the user from the plurality of scenes in the video.

CITATION LIST

Patent Literature

Patent Literature 1: Japanese Patent Laid-Open No. 2019-062502

Patent Literature 2: Japanese Patent Laid-Open No. 2010-259105

Patent Literature 3: Japanese Patent Laid-Open No. 2002-149897

Patent Literature 4: Japanese Patent Laid-Open No. 2017-224010

Patent Literature 5: Japanese Patent Laid-Open No. 2019-216355

SUMMARY OF INVENTION

Technical Problem

In website access analysis, since a site is a collection of multiple pages, it is easy to see what has been accessed on a per-page basis and to visualize what the interests and objectives of visitors are. However, in video delivery, a video contains a large amount of information but the video data is a single piece of data, and thus only vague data analysis has been possible, such as determining whether the video was played or not, how far the video was viewed on the time axis regardless of content, and what portions of the video were viewed. For example, even if an administrator of a video distributor wants to analyze the number, percentage, or the like of users who viewed a particular part of a video, such analysis has not been easy to perform.

As the use of video increases more in the future, an evaluation method that allows for visualization like with website access analysis is needed.

The information processing device described in Patent Literature 1 can acquire operation information including the playback start time and playback end time for each piece of content, and therefore can collect data on from where to where on the time axis each viewer has viewed, regardless of the content of the viewed video.

However, simply collecting data on from where to where on the time axis each viewer has viewed results in an enormous amount of data, making it difficult to perform analysis such as whether each of a large number of viewers viewed a plurality of particular parts or what percentage of viewers viewed a plurality of particular parts.

Likewise, in the program viewing terminal described in Patent Literature 2, the program position information extraction unit extracts selection position information including at least the start position and the end position of the selection operation in the program, and therefore can collect data on from where to where on a time axis each viewer has viewed, regardless of the content of the viewed video.

However, simply collecting data on from where to where on the time axis each viewer has viewed results in an enormous amount of data, making it difficult to perform analysis such as whether each of a large number of viewers viewed a plurality of particular parts or what percentage of viewers viewed each of a plurality of particular parts.

Also, in the case of the method of confirming the completion of information viewing described in Patent Literature 3, only playback completion is monitored on the basis of the playback completion identification means, and data on whether a particular part within a video was viewed cannot be collected.

Similarly, in the case of the advertisement viewing confirmation program described in Patent Literature 4, although the playback time and viewing time of the video are stored in the viewing time storing process, the main purpose of this is to determine whether the user viewed the video to the end and not grant return compensation if the user skipped midway through the advertisement video, and there is no description of collecting data on whether a particular part within the video was viewed.

In the information processing device described in Patent Literature 5, a scene tag is attached to each scene of the video, and the attached scene tag is extracted to detect whether each scene in the video was viewed. Consequently, if the administrator of the video distributor wants to analyze the number, percentage, or the like of users who viewed a particular part of a video, a specific scene tag can be attached to that part such that data on the number, percentage, or the like of users who viewed a particular part of a video can be collected relatively easily.

However, in the case of the information processing device described in Patent Literature 5, since the video data file needs to be modified, the work is relatively difficult, and furthermore, there are problems with attaching scene tags to video data, such as the inability to attach different scene tags for individual user attributes, like for internal and external use in an organization, for example.

The main objective of the present invention is to provide a video viewing providing device, a video viewing providing method, and a video viewing providing program that, in video delivery, allow for visualization of which scenes were viewed by each viewer for each scene with a caption freely set by an administrator of a distributor, and make it possible to easily evaluate a video or who has viewed the video.

Another objective of the present invention is to provide a video viewing providing device, a video viewing providing method, and a video viewing providing program that can be used as basic data for sales or marketing by evaluating who has viewed the video, or can be used as data for message penetration to each organization within a company.

Solution to Problem (1)

A video viewing providing device according to one aspect includes: a video delivery unit that delivers a video to a plurality of users; a scene setting unit that sets scenes with a caption in a plurality of parts of the video; a viewing evaluating unit that checks whether the users viewed the parts where the scenes with a caption are set; and a feedback unit that feeds back an evaluation result from the viewing evaluating unit to the users and a distributor of the video, wherein the scene setting unit generates data of a plurality of scenes with a caption including a caption and a start time and an end time on a timeline of the video.

In access analysis for video delivery of the related art, only vague data analysis has been possible, such as determining whether the video data as a whole was played or not, how far the video was viewed on the time axis regardless of content, and what portions of the video were viewed.

In contrast, in the video viewing providing device according to one aspect, by generating data of a plurality of scenes with a caption including the caption and the start time and end time on a timeline of the video in the scene setting unit and evaluating the viewing status of a user while referencing the data of scenes with a caption, it is possible to easily check whether each user has viewed the part where each scene with a caption is set.

Moreover, it is desirable to set the data of scenes with a caption as text data, for example, in a separate file from the video data file. This makes generation easy compared to the case of adding tags within the video data.

Furthermore, the results of checking whether each user has viewed the part where the scene with a caption is set can be used as basic data for sales or marketing, or can be used as data for message penetration to each organization within a company.

(2)

A video viewing providing device according to a second invention may be configured such that, in the video viewing providing device according to the one aspect, the data of scenes with a caption generated by the scene setting unit is saved as a scene data file separate from a video data file, and the scene data file that is different for each user with different attributes can be generated with respect to the single video data file.

For example, for an advertisement video, it may be desirable to set different data of scenes with a caption individually for each user attribute (male or female, for example) in some cases. In the video viewing providing device according to the second invention, even in such cases, by generating a plurality of scene data files and using a scene data file corresponding to each attribute in the viewing evaluating unit, a more appropriate evaluation of video viewing can be performed.

(3)

A video viewing providing device according to a third invention may be configured such that, in the video viewing providing device according to any from the one aspect to the second invention, the viewing evaluating unit checks whether the users viewed the parts where the scenes with a caption are set by checking whether the start time and the end time of each piece of the data of scenes with a caption are included in a viewing time of the users on the timeline of the video.

In this case, the viewing evaluating unit can check whether the user viewed the part where a scene with a caption is set by simply receiving information about the viewing time of each user on the timeline of the video.

(4)

A video viewing providing device according to a fourth invention may be configured such that, in the video viewing providing device according to the one aspect, the scene setting unit acquires a total duration of the video and sets a section between n/m and (n+1)/m of the total duration, where m is a positive integer and n is an integer from 0 to m−1, as each of the scenes with a caption, and the viewing evaluating unit monitors video playback at intervals of a first prescribed time from a start of playback, and considers the section as viewed if viewing is confirmed in a second prescribed time before an end of the section or a third prescribed time after the end of the section.

In the case of a setting a scene with a caption to any part of a video, additionally recording for each user the viewing time of the user on the timeline of the video, and checking whether the start time and end time of each piece of data of scenes with a caption are included in the viewing time, first, an administrator must set scenes with a caption in each video. Also, after saving the viewing time of each user, it is necessary to compare the viewing time to the start time and end time of each piece of data of scenes with a caption. Consequently, the burden on the administrator of video delivery increases, and as the number of users rises, the required amount of storage space and processing increases, too.

In contrast, in the video viewing providing device according to the fourth invention, scenes with a caption are set automatically and the viewing evaluation also simply records a viewing confirmation for each user at a second prescribed time before the end, or a third prescribed time after the end, of the m sections, thereby lowering the required amount of storage space and processing even if the number of users rises.

(5)

A video viewing providing device according to a fifth invention may be configured such that, in the video viewing providing device according to the one aspect, the scene setting unit is configured to execute a scene setting method for setting the scenes with a caption in any parts of the video and a scene setting method for acquiring a total duration of the video and setting a section between n/m and (n+1)/m of the total duration, where m is a positive integer and n is an integer from 0 to m−1, as each of the scenes with a caption, and the viewing evaluating unit is configured to execute a viewing evaluating method for checking whether the users viewed the parts where the scenes with a caption are set by checking whether a start time and an end time of each piece of the data of scenes with a caption are included in a viewing time of the users on the timeline of the video, and a viewing evaluating method for monitoring video playback at intervals of a first prescribed time from a start of playback, and considering the section as viewed if viewing is confirmed in a second prescribed time before an end of the section or a third prescribed time after the end of the section.

In this case, it is possible to choose between a more detailed evaluation of video viewing and a more efficient evaluation of video viewing, depending on the type of video provided or the user of the video.

(6)

A video viewing providing device according to a sixth invention may be configured such that, in the video viewing providing device according to the fourth or fifth invention, m is 10, the first prescribed time is 0.5 seconds, and the second prescribed time and the third prescribed time are both 1/100 of the total duration of the video.

In this case, by evaluating viewing of a video split into 10 sections, it is possible to grasp which portions of the video were viewed.

Monitoring video viewing every 1 second is not a problem for normal playback, but when the case of 2x playback and the like, monitoring every 0.5 seconds is desirable.

Moreover, although it is possible to evaluate whether each section of the video was viewed by confirming whether the end time of each section of the video was viewed, but for video viewing over the Internet, delays and the like on the communication channel may cause the viewing time detected by the video viewing providing device and the actual viewing time of the user to differ in some cases. In the video viewing providing device according to the sixth invention, by assuming that the video at the end time of each section was viewed if viewing is confirmed in the period of 1/100 of the total duration of the video before and after the end time of each segment, it is possible to reliably detect whether the end time of each section of the video was viewed.

(7)

A video viewing providing device according to a seventh invention may be configured such that, in the video viewing providing device according to any from the one aspect to the sixth invention, the data of scenes with a caption further includes points to be granted to the users who viewed each scene, and the feedback unit obtains total points of each user by adding up the points of the parts that each user viewed from the parts where the scenes with a caption are set.

In this case, by setting high points to a scene that the administrator of the video distributor wants users to view, the results and effects of viewing the video can be evaluated more objectively.

(8)

A video viewing providing device according to an eighth invention may be configured such that, in the video viewing providing device according to the seventh invention, the video is a video message from management in a company, and the points are used as data for message penetration to each organization within the company.

In this case, the points for each department can be evaluated, and additional measures can be implemented to penetrate the message to departments with low points, that is, departments that do not seem to be getting the message from management.

Additionally, in a video message from management within a company, the scene that should be viewed may differ depending on user attributes (such as development department, manufacturing department, and sales department or upper management, middle management, and young employees, for example). In such cases, a plurality of scene data files may be generated in which the scenes with a caption are set to the same parts and only the points differ for each user with different attributes.

(9)

A video viewing providing device according to a ninth invention may be configured such that, in the video viewing providing device according to the seventh invention, the video is an advertisement video, and the points are used as basic data for sales or marketing.

In this case, the video viewing providing device can be utilized as a more effective marketing tool through efforts such as, for example, if the video is for general customer marketing, such as the introduction of new products for the summer of 2021, users with 60 points or more can be extracted for direct mail distribution, or if the video is for one-on-one marketing to major clients, such as the introduction of new drugs for the first half of 2021, users with 80 points or more can be extracted to make appointments with by phone.

(10)

A video viewing providing device according to a 10th invention may be configured such that, in the video viewing providing device according to any from the one aspect to the ninth invention, the feedback unit calculates and graphs a percentage of the users who viewed each scene with a caption among all users.

In this case, the distributor of the video can evaluate the video objectively by visualizing the interest in each scene with a caption by the users who viewed the video.

(11)

A video viewing providing method according to another aspect includes: a video delivery step for distributing a video to a plurality of users; a scene setting step for setting scenes with a caption in a plurality of parts of the video; a viewing evaluating step for checking whether the users viewed the parts where the scenes with a caption are set; and a feedback step for feeding back an evaluation result from the viewing evaluating step to the users and a distributor of the video, wherein in the scene setting step, data of a plurality of scenes with a caption including a caption and a start time and an end time on a timeline of the video are generated.

The video viewing providing method according to another aspect is a video viewing providing method that corresponds to the video viewing providing device according to one aspect.

(12)

A video viewing providing method according to a 12th invention may be configured such that, in the video viewing providing method according to the other aspect, the scene setting step acquires a total duration of the video and sets a section between $n/m$ and $(n+1)/m$ of the total duration, where m is a positive integer and n is an integer from 0 to $m-1$, as each of the scenes with a caption, and the viewing evaluating step monitors video playback at intervals of a first prescribed time from a start of playback, and considers the section as viewed if viewing is confirmed in a second prescribed time before an end of the section or a third prescribed time after the end of the section.

The video viewing providing method according to the 12th invention is a viewing method that corresponds to the video viewing providing device according to the fourth invention.

(13)

A video viewing providing program according to yet another aspect includes: a video delivery process that delivers a video to a plurality of users; a scene setting process for setting scenes with a caption in a plurality of parts of the video; a viewing evaluating process that checks whether the users viewed the parts where the scenes with a caption are set; and a feedback process that feeds back an evaluation result from the viewing evaluating process to the users and a distributor of the video, wherein in the scene setting process, data of a plurality of scenes with a caption including a caption and a start time and an end time on a timeline of the video are generated.

The video viewing providing program according to yet another aspect is a video viewing providing program that corresponds to the video viewing providing device according to one aspect.

Note that the scene setting process is, for example, a program with which the administrator of the video distributor inputs a caption and clicks a button at the start time and end time while viewing the video to generate data of scenes with a caption, and the feedback process is, for example, a program that totals points and displays a graph, a program that, in the case of viewing an advertisement video, automatically extracts users with 60 points or more and dispatches direct mail, or the like.

(14)

A video viewing providing program according to a 14th invention may be configured such that, in the video viewing providing program according to yet another aspect, the scene setting process acquires a total duration of the video and sets a section between $n/m$ and $(n+1)/m$ of the total duration, where m is a positive integer and n is an integer from 0 to $m-1$, as each of the scenes with a caption, and the viewing evaluating process monitors video playback at intervals of a first prescribed time from a start of playback, and considers the section as viewed if viewing is confirmed in a second prescribed time before an end of the section or a third prescribed time after the end of the section.

The video viewing providing method according to the 14th invention is a viewing program that corresponds to the video viewing providing device according to the fourth invention.

BRIEF DESCRIPTION OF DRAWINGS

FIG. 8(*a*) is a schematic flowchart illustrating an example of feedback by the feedback unit in the case of using the video viewing providing device with a video message from management, and FIG. 8(*b*) is a schematic flowchart illustrating an example of feedback by the feedback unit in the case of using the video viewing providing device with an advertisement video.

DESCRIPTION OF EMBODIMENTS

Hereinafter, embodiments of the present invention will be described with reference to the drawings. In the following description, like components are denoted with like signs. Also, in cases where the signs are the same, the names and functions are also the same. Consequently, a detailed description of these portions will not be repeated.

First Embodiment

Figure 1:
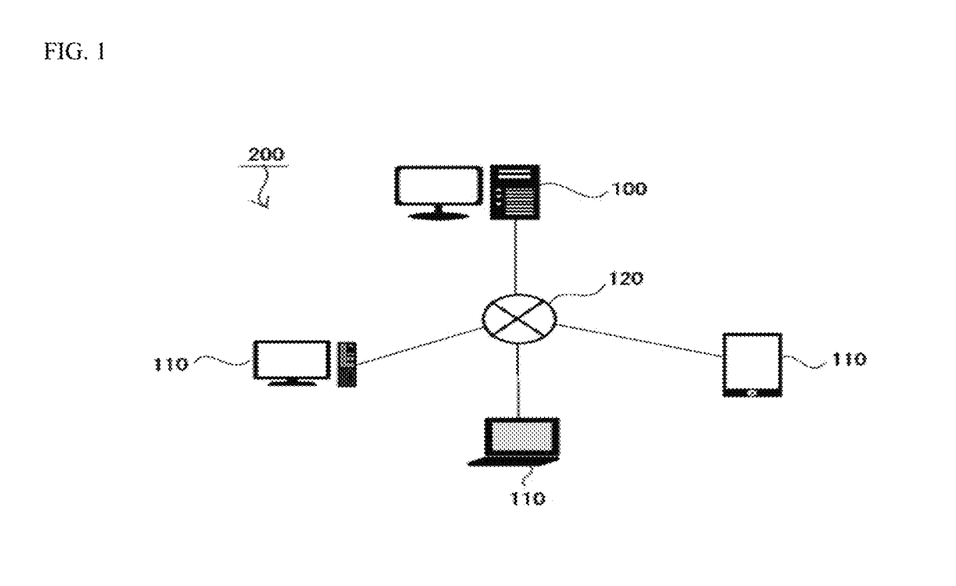
FIG. 1 is a schematic diagram illustrating an overall configuration of a video viewing system incorporating a video viewing providing device of a first embodiment.
Figure 2:
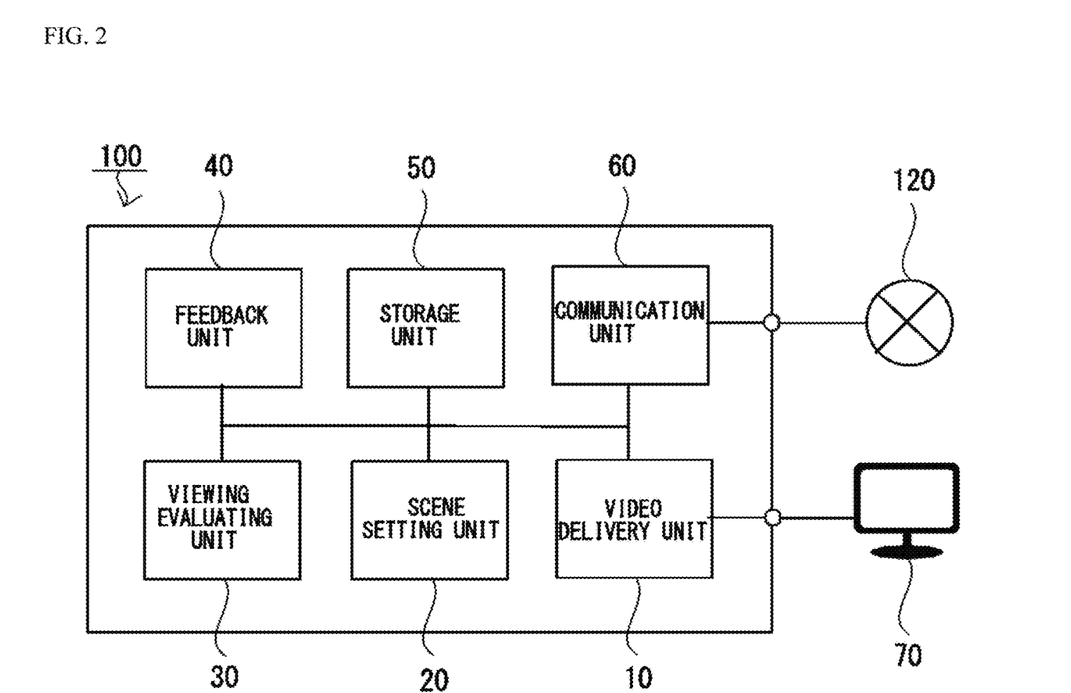
FIG. 2 is a schematic block diagram illustrating the configuration of the video viewing providing device of the first embodiment.
Figure 3:
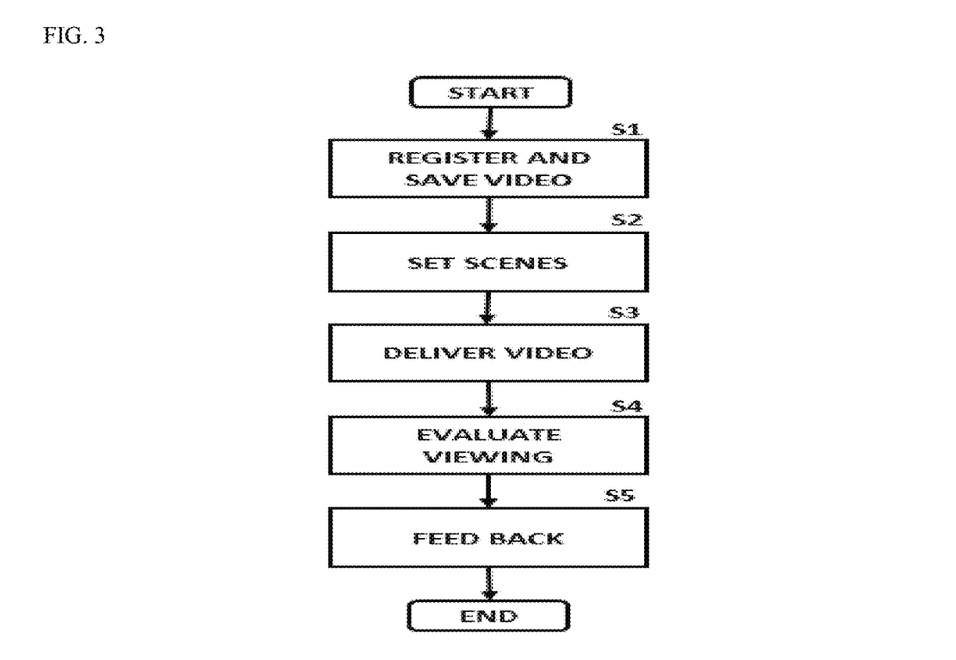
FIG. 3 is a schematic flowchart illustrating the operations of the video viewing providing device of the first embodiment.

FIG. 1 is a schematic diagram illustrating an overall configuration of a video viewing system 200 incorporating a video viewing providing device 100 of a first embodiment, FIG. 2 is a schematic block diagram illustrating the configuration of the video viewing providing device 100, and FIG. 3 is a schematic flowchart illustrating the operations of the video viewing providing device 100.

In FIG. 1, the video viewing providing device 100 is connected to user terminals 110 through a network 120. The user terminals 110 may be desktop computers, laptop computers, smartphones, and the like, but the user terminals 110 may be any devices capable of video playback that can connect to the video viewing providing device 100 through the network 120, and thus are not limited to the above.

Also, DOUPA!(R) can be used as the video viewing system 200, for example, but otherwise, a member site or an EC site where users have registered account information is also usable.

In FIG. 2, the video viewing providing device 100 is provided with a video delivery unit 10, a scene setting unit 20, a viewing evaluating unit 30, a feedback unit 40, a storage unit 50, a communication unit 60, and a display 70.

A produced video, such as a video message from management or an advertisement video, is received from the network 120 through the communication unit 60 and saved in the storage unit 50 (step S1 in FIG. 3).

The video saved in the storage unit 50 can be displayed on the display 70 by the video delivery unit 10.

The scene setting unit 20 sets a plurality of scenes with a caption by designating, with respect to a video saved in the storage unit 50 and displayed on the display 70, a caption and a start time and end time on a timeline of the video (step S2).

Also, the video is delivered to the user terminals 110 through the communication unit 60 and the network 120. Users view the delivered video with a video player installed in the user terminals (step S3).

Note that before viewing the video, the users authenticate their identity by logging in, entering a password, or the like. The video player is not particularly limited insofar as the video player is in a format that can be loaded into the video viewing system 200 such as DOUPA!(R).

The viewing evaluating unit 30 is connected to the user terminals 110 through the communication unit 60 and the network 120, and when the video is played on the user terminals 110, the viewing evaluating unit 30 receives a viewing start time and viewing end time on the timeline of the video and checks whether the users viewed the parts where scenes with a caption are set (step S4).

The feedback unit 40 receives from the viewing evaluating unit 30 information related to which scenes with a caption were viewed by each user, calculates total points for each user, and provides feedback to each user according to the total points (step S5).

(Operations of Scene Setting Unit 20)

Figure 4:
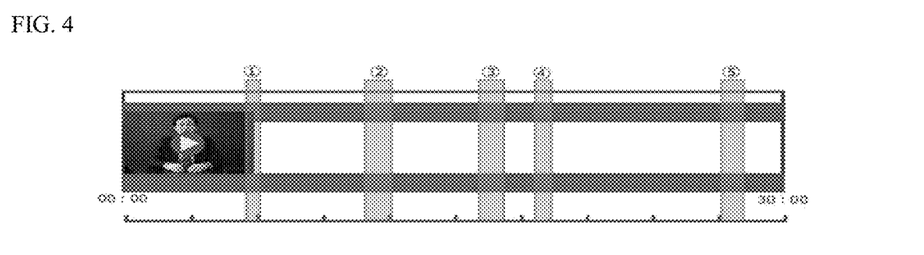
FIG. 4 is a schematic diagram illustrating an example of scene setting by a scene setting unit.
Figure 5:
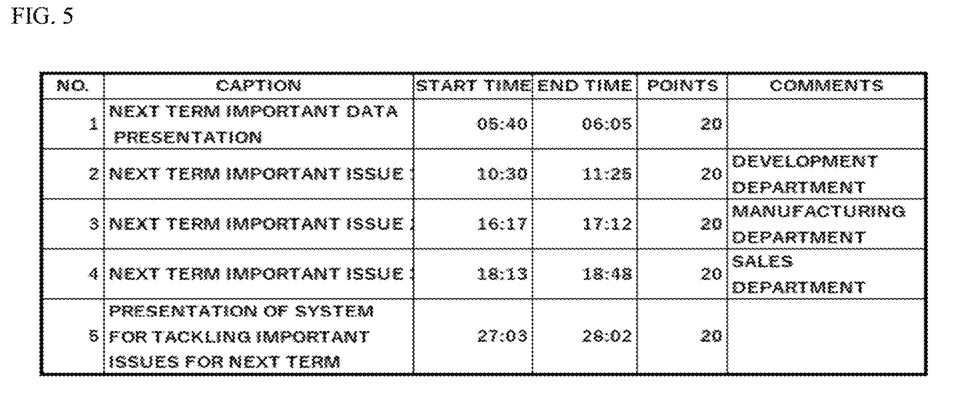
FIG. 5 is a table illustrating an example of the content of a scene data file.

FIG. 4 illustrates an example of scene setting operations by the scene setting unit 20, and FIG. 5 illustrates an example of the content of a scene data file in which data of a plurality of scenes with a caption are saved. FIGS. 4 and 5 are examples of a video message from the president of a company.

The administrator of the video distributor who performs the scene setting selects a video for viewing evaluation from a video list and sets a period (date and time) of the viewing evaluation.

Next, the administrator plays the video and checks the start time and end time of each scene with a caption to be set. In this case, as in FIG. 4, for example, it is desirable for the scene setting unit 20 to have a function with which the playback image of each position on the timeline can be checked by scrolling, and the start time and end time of each scene with a caption can be acquired by defining a frame on the timeline.

Alternatively, the video may be played back normally, and the start time and end time of each scene with a caption may be acquired.

Data about the scenes with a caption for which a start time and an end time have been acquired is collected into a scene data file like in FIG. 5. In FIG. 5, a caption field, a start time field, and an end time field in addition to a points field and a comments field are set. In FIG. 5, the length of each scene with a caption is one minute or less. However, depending on the content of the video, the length of a scene with a caption may be longer than one minute.

The points field is used when calculating total points in the feedback unit 40. In FIG. 5, the points for the scenes with a caption are all 20 points each, but more points may be set for a scene thought to be more important. Also, if important issues 1, 2, and 3 are issues for the development department, manufacturing department, and sales department, respectively, a scene data file for the development department, a scene data file for the manufacturing department, and a scene data file for the sales department may be created separately, and for user with different attributes, more points may be set for the scene of the important issue for each department.

Also, points are usually distributed so that the maximum total score is 100 points per user, but for the type of video that is to be viewed repeatedly, the score for a single user may exceed 100 points.

The scene data file can be embedded into the video data file, but also can be created as a separate file from the video data file. In the case of changing the content (such as points)

of the scene data file for each department, creating the scene data file as a separate file from the video data file is preferable.

(Operations of Viewing Evaluating Unit 30)

Figure 6:
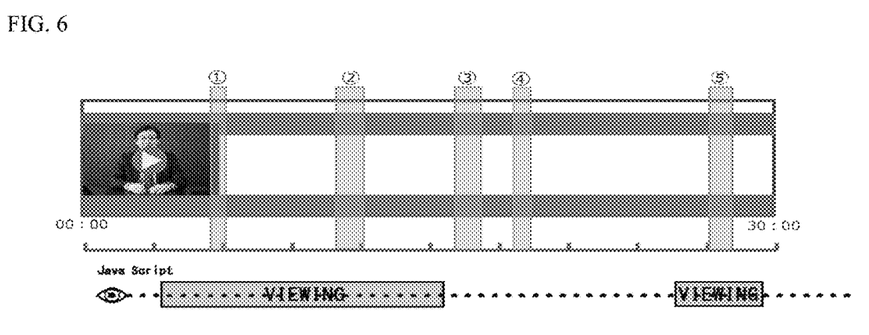
FIG. 6 is a schematic diagram illustrating an example of viewing evaluation by a viewing evaluating unit.

FIG. 6 is a schematic diagram illustrating an example of viewing evaluating operation by the viewing evaluating unit 30.

When the user terminal 110 starts the viewing of a video, the viewing evaluating unit 30 uses JavaScript® set in a video viewing page to monitor playback of the video every 0.5 seconds, for example, from the start of video viewing and receive viewing time information on the timeline of the video.

Additionally, the viewing evaluating unit 30 checks whether the time of each scene with a caption is included in the received viewing time, and treats scenes with a caption for which 70% or more, for example, of the time of the scene with a caption is included in the viewing time as scenes with a caption that have been viewed from the scenes with a caption.

In the example in FIG. 6 the scenes with a caption numbered 1, 2, and 5 have been viewed.

Note that the viewing evaluating unit 30 starts the viewing evaluation at the beginning of a target period of viewing evaluation, and ends the viewing evaluation at the end of the target period.

(Operations of Feedback Unit 40)

The feedback unit 40 receives the evaluation results from the viewing evaluating unit 30 and calculates user total points as feedback to the users, while also providing data such as the percentage of users who viewed each scene with a caption among all users to thereby provide a video evaluation result as feedback to the distributor of the video.

Figure 7:
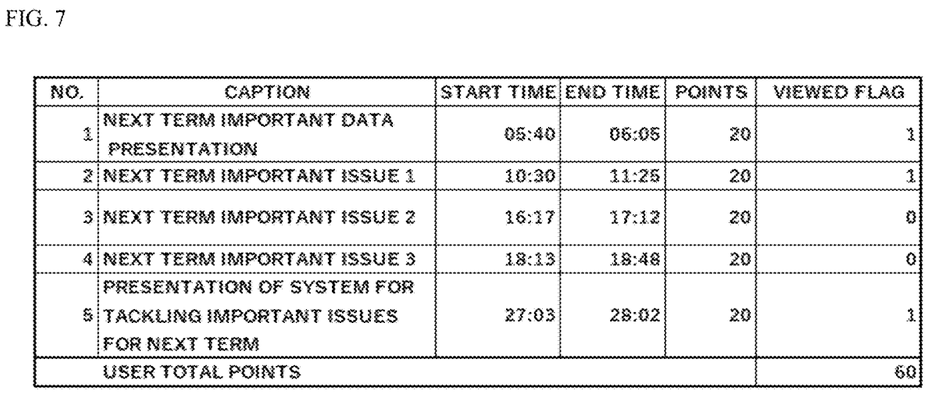
FIG. 7 is a table illustrating an example of the calculation of user total points by a feedback unit.

FIG. 7 is a table illustrating an example of the calculation of user total points by the feedback unit 40.

In FIG. 7, a viewed flag field is set to 1 for the scenes with a caption numbers 1, 2, and 5 that were viewed by the user, and the viewed flag field is set to 0 for the scenes with a caption numbered 3 and 4 that were not viewed.

The feedback unit 40 calculates the user total points by adding up the points multiplied by the viewed flag for each scene with a caption. In the example in FIG. 7, the user total points are 60 points.

Note that in FIG. 7, the points for the scenes with a caption are all 20 points each, but if the points in the scene data file are changed in accordance with user attributes, the user total points may be different even for users with the same viewed flags in some cases.

After the end of the target period of the viewing evaluation, the administrator of the video distributor can extract the users who viewed the video and download CSV data, various graphs, and the like detailing the points for each scene with a caption and the total points of the users.

Figure 8:
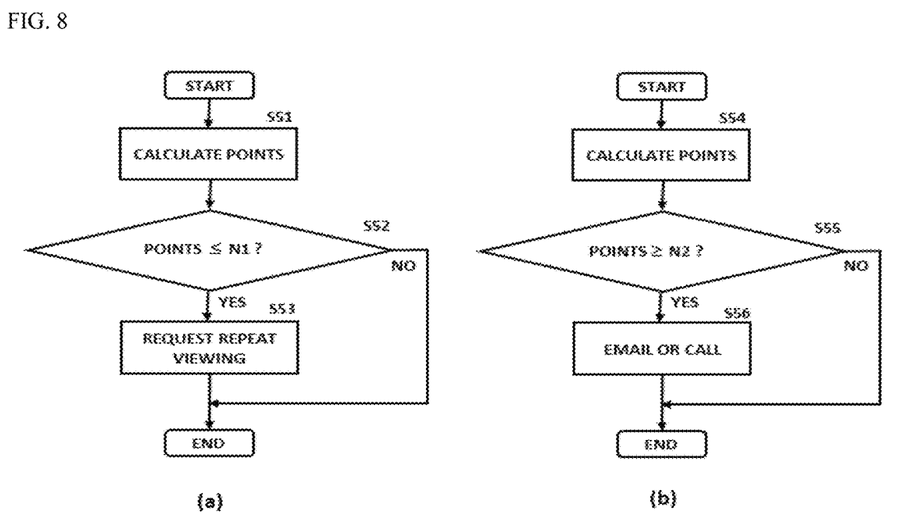

FIG. 8(a) is a schematic flowchart illustrating an example of operations by the feedback unit 40 in the case of using the video viewing providing device 100 to provide a video message from management, and FIG. 8(b) is a schematic flowchart illustrating an example of operations by the feedback unit 40 in the case of using the video viewing providing device 100 with an advertisement video.

The points calculation in steps S51 and S54 is as described above (see FIG. 7), and is the same in both steps.

In the case of using the video viewing providing device 100 to provide a video message from management, it is checked whether the user total points of each user are less than or equal to prescribed points N1 (step S52). Then, email requesting another viewing is automatically generated and sent to users whose total points are less than or equal to the prescribed points N1 (step S53). In the present embodiment, N1 is 60 points, for example. In this case, the user in FIG. 7 would receive the email requesting another viewing.

Note that the check of the user total points in step S52 above may also calculate the average value of the user total points by department and request another viewing by department with respect to departments having an average value less than or equal to N1.

In the case of using the video viewing providing device 100 to provide an advertisement video, it is checked whether the user total points of each user are equal to or greater than prescribed points N2 (step S55). Then, a follow-up sales approach is pursued for users whose total points are equal to or greater than the prescribed points N2 (step S56).

Specifically, for example, if the video is a video introducing new clothing for the summer of 2021, N2 may be set to 60 points and direct mail may be created and mailed automatically to users with 60 points or more. In another example, if the video is a video introducing new drugs for the first half of 2021, N2 may be set to 80 points and a sales representative may make phone appointments with users with 80 points or more.

The feedback unit 40 can visualize the evaluation of the video by calculating and graphing the percentage of users who viewed each scene with a caption among all users.

Figure 9:
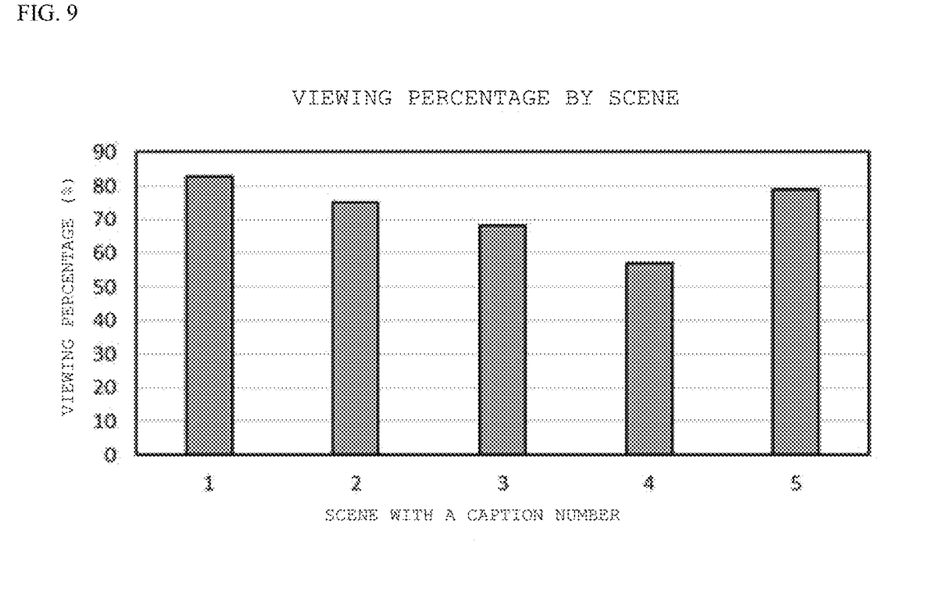
FIG. 9 is a graph illustrating the percentage of users who viewed each scene with a caption among all users.

FIG. 9 is an example of a graph illustrating the percentage of users who viewed each scene with a caption among all users in the case of a video message from management.

The numbers of the scenes with a caption in FIG. 9 correspond to FIG. 5. In the case of FIG. 9, the viewing percentage is high for the next-term important data presentation of number 1, but the viewing percentage is low for the important issue 3 of number 4. This may be because user interest in the important issue 3 was low to begin with, but with the viewing evaluating unit 30 of the present invention, only the users who viewed the part of the scene with a caption to the end are determined to have viewed the scene, and therefore the reason may also be that the content of the scene with a caption of number 4 did not attract user interest.

Also, in the case in which the video is an advertisement video, by associating an individual product with each scene with a caption, it is possible to read from the graph which products are attracting higher user interest.

Additionally, the data such as the user total points of each user and the percentage of users who viewed the scenes with a caption can be used as data for message penetration to each organization within a company and as basic data for sales or marketing.

Second Embodiment

The video viewing providing device 100 of the first embodiment performs the viewing evaluation by setting a scene with a caption to any part of a video, additionally recording for each user the viewing time of the user on the timeline of the video, and checking whether the start time and end time of each piece of data of scenes with a caption are included in the viewing time. In contrast, the video viewing providing device 100 of the second embodiment performs the viewing evaluation by dividing the entire video into m segments, where m is a positive integer, treating each of the m segments as a scene with a caption, and checking for each user whether viewing is confirmed at a first prescribed time before the end, or at a second prescribed after the end, of the m segments.

Consequently, the configuration of the video viewing providing device 100 of the second embodiment, the overall configuration of the video viewing system 200 incorporating the video viewing providing device 100, and the schematic flowcharts illustrating the operations of the video viewing providing device 100 are identical to the first embodiment, and FIGS. 1-3 also apply to the second embodiment.

Figure 10:
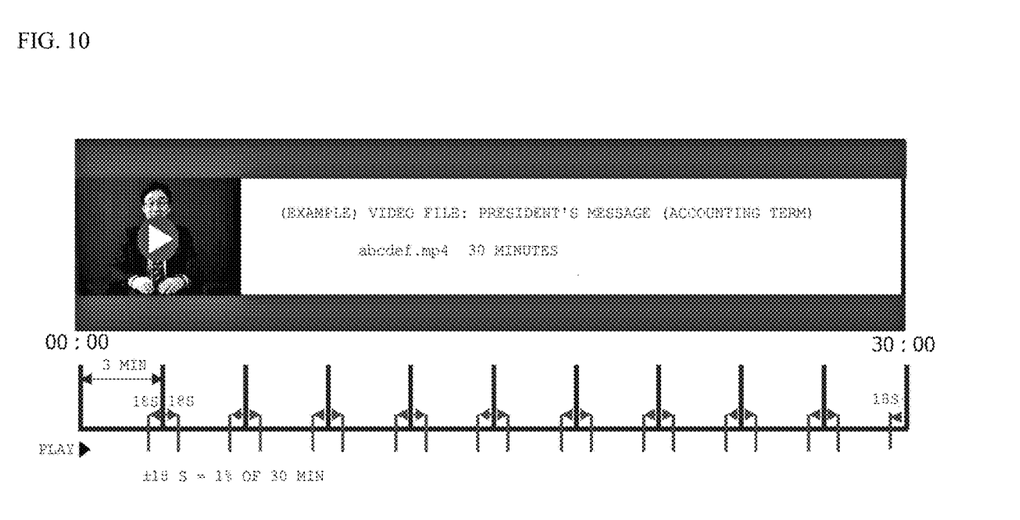
FIG. 10 is a schematic diagram illustrating an example of scene setting by the scene setting unit and viewing evaluation by the viewing evaluating unit in a second embodiment.

FIG. 10 illustrates an example of scene setting by the scene setting unit 20 and viewing evaluation by the viewing evaluating unit 30 in the second embodiment. In the example in FIG. 10, m=10, and the first and second prescribed times are both 18 seconds.

The scene setting unit 20 of the second embodiment first acquires the overall video length (total duration), which is 30 minutes in the case of FIG. 10, and divides the video into 10 segments to form 10 scenes with a caption of three minutes each. In this case, the captions of the scenes are 1st scene, 2nd scene, . . . , 10th scene, for example.

The viewing evaluating unit 30 of the second embodiment monitors video playback every 0.5 seconds from the start of playback, and if viewing is confirmed in the 18 seconds of time before the end or the 18 seconds of time after the end of the 10 segments, the scene is considered to have been viewed by each user for whom viewing is confirmed.

Note that a 1 second time interval of the video viewing monitoring is not a problem for normal playback, but when the case of 2x playback and the like, monitoring every 0.5 seconds is desirable. Furthermore, the time interval may be set shorter than 0.5 seconds when an improvement in monitoring precision is desirable, and may be set longer than 0.5 seconds when a reduction in monitoring processing is desirable.

Also, it is desirable for the 18 seconds of time for confirming that a scene was viewed to be about 1/100 of the total duration of the video, but may be set longer or shorter to suit the latency of the communication channel in video viewing over the Internet.

In the case of a setting a scene with a caption to any part of a video, additionally recording for each user the viewing time of the user on the timeline of the video, and checking whether the start time and end time of each piece of data of scenes with a caption are included in the viewing time, first, an administrator must set scenes with a caption in each video. Also, after saving the viewing time of each user, it is necessary to compare the viewing time to the start time and end time of each piece of data of scenes with a caption. Consequently, the burden on the administrator of video delivery increases, and as the number of users rises, the required amount of storage space and processing increases, too.

In contrast, in the video viewing providing device 100 of the second embodiment, scenes with a caption are set automatically and the viewing evaluation also simply records a viewing confirmation for each user at a first prescribed time before the end, or a second prescribed time after the end, of the m sections, thereby lowering the required amount of storage space and processing even if the number of users rises.

Note that since the configuration of the video viewing providing device 100, the overall configuration of the video viewing system 200 incorporating the video viewing providing device 100, and the basic flowcharts illustrating the operations of the video viewing providing device 100 are the same in the first and second embodiments, by incorporating the video viewing providing programs of both the first and second embodiments, for example, a video viewing providing device 100 provided with both the functions of the video viewing providing device 100 of the first embodiment and the functions of the video viewing providing device 100 of the second embodiment can be configured.

In this case, it is possible to choose between a more detailed evaluation of video viewing and a more efficient evaluation of video viewing, depending on the type of video provided or the user of the video.

In the present invention, the video delivery unit corresponds to a "video delivery unit", the scene setting unit 20 corresponds to a "scene setting unit", the viewing evaluating unit 30 corresponds to a "viewing evaluating unit", the feedback unit 40 corresponds to a "feedback unit", and the video viewing providing device 100 corresponds to a "video viewing providing device".

The foregoing describes preferred embodiments of the present invention, but the present invention is not limited thereto. It should be understood that various embodiments are possible without departing from the spirit and scope of the present invention. Furthermore, actions and effects obtained by a configuration of the present invention are described in the foregoing embodiments, but these actions and effects are merely examples and do not limit the present invention.

REFERENCE SIGNS LIST

10 Video delivery unit
20 Scene setting unit
30 Viewing evaluating unit
40 Feedback unit
100 Video viewing providing device

What is claimed is:

1. A video viewing providing method comprising:
   distributing a video to a plurality of users;
   acquiring a total duration of the video and setting a section between n/m and (n+1)/m of the total duration, where m is a positive integer and n is an integer from 0 to m−1, as each of the scenes with a caption;
   monitoring video playback at intervals of a first prescribed time from a start of playback, and considering the scene as viewed if viewing is confirmed during the time from T/10 before the end of the scene to T/10 after the end of the scene, where T is the time for each scene with a caption; and
   feeding back an evaluation result from the monitoring and considering to the users and a distributor of the video.

2. A computer program product comprising at least one non-transitory computer readable storage medium storing computer code that, when executed by a video viewing providing device, cause the video viewing providing device to execute the processes comprising:
   distributing a video to a plurality of users;
   acquiring a total duration of the video and setting a section between n/m and (n+1)/m of the total duration, where m is a positive integer and n is an integer from 0 to m−1, as each of the scenes with a caption;
   monitoring video playback at intervals of a first prescribed time from a start of playback, and considering the scene as viewed if viewing is confirmed during the time from T/10 before the end of the scene to T/10 after the end of the scene, where T is the time for each scene with a caption; and
   feeding back an evaluation result from the monitoring and considering to the users and a distributor of the video.

3. The computer program product according to claim 2, wherein data of the scenes with the caption is saved as a scene data file separate from a video data file, and the scene data file that is different for each user with different attributes can be generated with respect to the single video data file.

4. The computer program product according to claim 2, wherein the m is 10, and the first prescribed time is 0.5 seconds.

5. The computer program product according to claim 2, wherein data of the scenes with the caption further includes points to be granted to the users who viewed each scene, and the feeding back obtains total points of each user by adding up the points of the parts that each user viewed from the parts where the scenes with the caption are set.

6. The computer program product according to claim 5, wherein the video is a video message from management in a company, and the points are used as data for message penetration to each organization within the company.

7. The computer program product according to claim 5, wherein the video is an advertisement video, and the points are used as basic data for sales or marketing.

8. The computer program product according to claim 2, wherein the feeding back calculates and graphs a percentage of the users who viewed each scene with a caption among all users.

\* \* \* \* \*